(12) United States Patent
Huetter et al.

(10) Patent No.: US 8,335,818 B2
(45) Date of Patent: Dec. 18, 2012

(54) METHOD FOR DETECTION OF THE ACTIVITY OF A DEVICE IN A NETWORK OF DISTRIBUTED STATIONS, AS WELL AS A NETWORK STATION FOR CARRYING OUT THE METHOD

(75) Inventors: Ingo Huetter, Pattensen (DE); Michael Weber, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 167 days.

(21) Appl. No.: 11/988,777

(22) PCT Filed: Jun. 2, 2006

(86) PCT No.: PCT/EP2006/062879
§ 371 (c)(1),
(2), (4) Date: Jan. 14, 2008

(87) PCT Pub. No.: WO2007/006611
PCT Pub. Date: Jan. 18, 2007

(65) Prior Publication Data
US 2009/0210525 A1 Aug. 20, 2009

(30) Foreign Application Priority Data
Jul. 13, 2005 (DE) .......................... 10 2005 033 211

(51) Int. Cl.
*G06F 15/16* (2006.01)
(52) U.S. Cl. ......... 709/203; 709/217; 709/220; 370/481
(58) Field of Classification Search .................. 709/203, 709/217, 230, 220, 227; 370/241
See application file for complete search history.

(56) References Cited

U.S. PATENT DOCUMENTS
7,092,999 B2 * 8/2006 Levitan .......................... 709/218
(Continued)

FOREIGN PATENT DOCUMENTS
DE 10250102 7/2002
(Continued)

OTHER PUBLICATIONS

M. Bodlaender et al: "Enhancing discovery with liveness", Consumer Communications and Networking Conference, 2004, CCNC 2004, First IEEE Conference, Jan. 5, 2004, pp. 636-638 Search Report dated Aug. 18, 2006.

*Primary Examiner* — Khanh Dinh
(74) *Attorney, Agent, or Firm* — Tutunjian & Bitetto, P.C.

(57) ABSTRACT

The invention relates to the technical field of local data transmission networks, in particular domestic networks. In networks such as these, the network stations log on in connection to the network. On disconnection, the network station which is leaving the network logs off in an appropriate manner. In the situation in which the user disconnects a network station simply by pulling out the network cable from the network, it is physically impossible to transmit the logging-off message. The invention is now concerned with the problem of how reliably an inactive network station can be identified, also taking account of the disconnection of the network station simply by pulling out the network plug. The invention solves the problem by regular transmission of a search request to the stations in the network. If a search request remains unanswered by one network station, an HTTP access is additionally attempted to, for example, the device description of the network station in question, or a control request. The network station is identified as being inactive only if this access/control request also fails. In the case of a UPnP network, the search request is made using the unprotected SSDP protocol, so that the lack of any response to the search request does not in its own right reliably indicate that the network station has logged off. The supposition that the network station which did not respond to the search request is inactive is confirmed by means of the HTTP access, which takes place on an error-protected basis.

16 Claims, 3 Drawing Sheets

Isochronous or asynchronous data traffic

U.S. PATENT DOCUMENTS

| | | | |
|---|---|---|---|
| 7,295,119 B2 * | 11/2007 | Rappaport et al. | 340/572.4 |
| 7,647,385 B2 * | 1/2010 | Encarnacion et al. | 709/217 |
| 2002/0078161 A1 | 6/2002 | Cheng | |
| 2002/0105911 A1 * | 8/2002 | Pruthi et al. | 370/241 |
| 2003/0229681 A1 * | 12/2003 | Levitan | 709/218 |
| 2004/0073609 A1 * | 4/2004 | Maekawa et al. | 709/203 |
| 2004/0111536 A1 * | 6/2004 | Ellerbrock et al. | 709/250 |
| 2004/0249923 A1 | 12/2004 | Ko et al. | |
| 2005/0099982 A1 | 5/2005 | Sohn et al. | |
| 2005/0108331 A1 | 5/2005 | Osterman | |
| 2005/0120124 A1 * | 6/2005 | Korhonen | 709/231 |
| 2005/0122934 A1 | 6/2005 | Fujita | |
| 2005/0138193 A1 * | 6/2005 | Encarnacion et al. | 709/230 |
| 2005/0286427 A1 | 12/2005 | Hutter | |
| 2008/0172506 A1 * | 7/2008 | Ellerbrock et al. | 710/104 |
| 2009/0104913 A1 * | 4/2009 | Karls et al. | 455/450 |

FOREIGN PATENT DOCUMENTS

| | | |
|---|---|---|
| EP | 1469654 | 10/2004 |
| JP | 2002152204 | 5/2002 |
| JP | 2002330191 | 11/2002 |
| JP | 2003067264 | 3/2003 |
| WO | WO0131952 | 5/2001 |

* cited by examiner

METHOD FOR DETECTION OF THE ACTIVITY OF A DEVICE IN A NETWORK OF DISTRIBUTED STATIONS, AS WELL AS A NETWORK STATION FOR CARRYING OUT THE METHOD

This application claims the benefit, under 35 U.S.C. §365 of International Application PCT/EP2006/062879, filed Jun. 2, 2006, which was published in accordance with PCT Article 21(2) on Jan. 18, 2007 in English and which claims the benefit of German patent application No. 10 2005 033211.0, filed Jul. 13, 2005.

The invention relates to the technical field of local area networks, in particular domestic networks.

BACKGROUND TO THE INVENTION

Various domestic network standards are available for the networking of devices in the domestic field. One consortium of companies, in particular the companies in the computer industry, led by Microsoft, have started an initiative for the specification of network control software, based on the existing Internet Protocol (IP). This network system has become known by the abbreviation UPnP (Universal Plug and Play). The UPnP system is based on a series of standardized network protocols and data formats and is used for controlling devices from different manufacturers (including typical devices from the computer industry such as PCs, routers, printers, scanners, as well as domestic entertainment electronic devices as well as domestic devices in the field of white goods and building control systems). The devices are networked via an IP-based network, with or without central monitoring by a "residential gateway". In this case, the network system is in the form of a plug and play system, that is to say the network is configured without any interaction with the user. A control point device, corresponding to a control point, can autonomously find the devices in the network. All types of medium which support IP communication can be used as physical transmission media, that is to say by way of example Ethernet, Firewire, radio transmission systems such as Bluetooth and WirelessLAN etc. Standardized technologies such as IP, UDP, corresponding to User Datagram Protocol, Multicast, TCP corresponding to Transmission Control Protocol, HTTP, corresponding to Hyper Text Transfer Protocol, XML, corresponding to Extended Mark up Language, SOAP, corresponding to Simple Object Access Protocol and SSDP, corresponding to Simple Service Discovery Protocol are used.

The UPnP specification describes how devices based on the UPnP standard are set up, and how they can be monitored. One of the basic ideas of this specification is that it is possible to operate any UPnP device via a standard web browser. For this purpose, every UPnP device has a web server on which the HTML pages for operation of the device (the so-called presentation pages) are stored.

In the UPnP network system, a confirmation process is carried out in which new stations in the network must log on, and disconnected stations must log off from the network. This is done by means of special messages in accordance with the SSDP protocol. The UPnP standard provides for the individual network stations to regularly notify their activity. This is done by means of an SSDP message, specifically "ssdp: alive", which a network station must send at least every 1800 seconds. This corresponds to a minimum session duration of half an hour.

When the devices leave the network, they should also send a logging-off message of the "ssdp:byebye" type. When the logging-off message is sent, a control point device can use this to quickly confirm that a UPnP device has left the network. In addition, the control point device could also use the lack of any activity confirmation message after the defined repetition interval to identify that the corresponding network station has been switched to be inactive. In fact, it is possible for the devices to send an ssdp:byebye message when they are switched off and thus in principle are no longer in the network—even if they are still connected to it. However, if they are disconnected from the network by pulling out the cable, it is no longer possible for physical reasons to send the logging-off message that has been mentioned. Since the minimum time period to be observed is, however, rather long at half an hour, this can have unexpected reactions for the user. Particularly if a user wishes to use a device which has already been switched to be no longer active for some time, but the activity confirmation message has not yet been absent for the maximum permissible period, the network does not respond ideally. This is because, as soon as it accesses the supposedly existent device, it finds that it is no longer active and it will suddenly disappear from the user menu, which can confuse the user.

INVENTION

The aim of the invention is to provide a more user-friendly response in the event of unidentified device logging-off messages.

The solution according to the invention is based on a control point device sending search requests to the network stations regularly at short time intervals. This is permissible in accordance with the UPnP specification, and there is no minimum time interval for such search requests. By way of example, search requests can thus be sent every five, ten or fifteen seconds. The addressed network stations must respond to such search requests. If there is no response from individual devices, the control point device can find out which devices have left the network.

However, in this context it must be remembered that both the search requests and the associated responses are sent as UDP packets, that is to say there is no assurance that the packets will also actually reach the addressee. UDP is an unprotected data transmission protocol. This is a problem in particular when individual devices communicate with the network via a wire-free link. The problem can admittedly be solved by an approach in which the lack of a single response to a search request does not result in the assumption that a device is inactive, with this assumption being made only after the absence of two or more responses. However, this in turn has the disadvantage that it takes longer to identify whether a device has actually been logged off from the network.

In order to solve this additional problem, the invention provides that, in the absence of a response to a search request, an error-protected transmission protocol is additionally used to check whether the device is still active. The SSDP protocol as well as the entire chapter on device recognition in accordance with the UPnP specification admittedly do not support this measure, but there is a capability to check the existence of a device in a simple manner within the UPnP specification. According to the specification, every UPnP device has a web server via which information relating to the device can be accessed. This information includes, for example, the so-called device descriptions as well as the service descriptions. These are both XML files. These files are accessed exclusively by the HTTP protocol. The HTTP protocol is an error-protected protocol, since it is based on the TCP protocol. The control point device in any case knows the URL, corresponding to uniform resource locator of the device description of a UPnP device, because this is transmitted to all the network stations when the device logs on. The control point device can therefore use an HTTP access to the device description or some other existing file in the absence of the already described responses to the search requests to determine whether the device is still active in the network. Alternatively, a control request can also be sent to a device to be controlled, and this is also sent via HTTP. If it is possible to set up an HTTP link, the device is still active, but if this is no longer possible, it has been removed from the network.

This therefore overcomes the user-unfriendly response— as described above.

Advantageous developments and improvements of the method according to the invention and of the apparatus according to the invention are possible by means of the measures described in the dependent claims.

If an HTTP head access is used for data access, this has the advantage that only minimal amounts of data need be transferred. When an activity check is carried out by sending a control request, it is advantageous to use an HTTP post access. In this case, it is also advantageous for the control request not to change the state of the addressed device.

DRAWINGS

Exemplary embodiments of the invention will be explained in more detail in the following description and are illustrated in the drawings, in which.

EXEMPLARY EMBODIMENTS OF THE INVENTION

Figure 1:
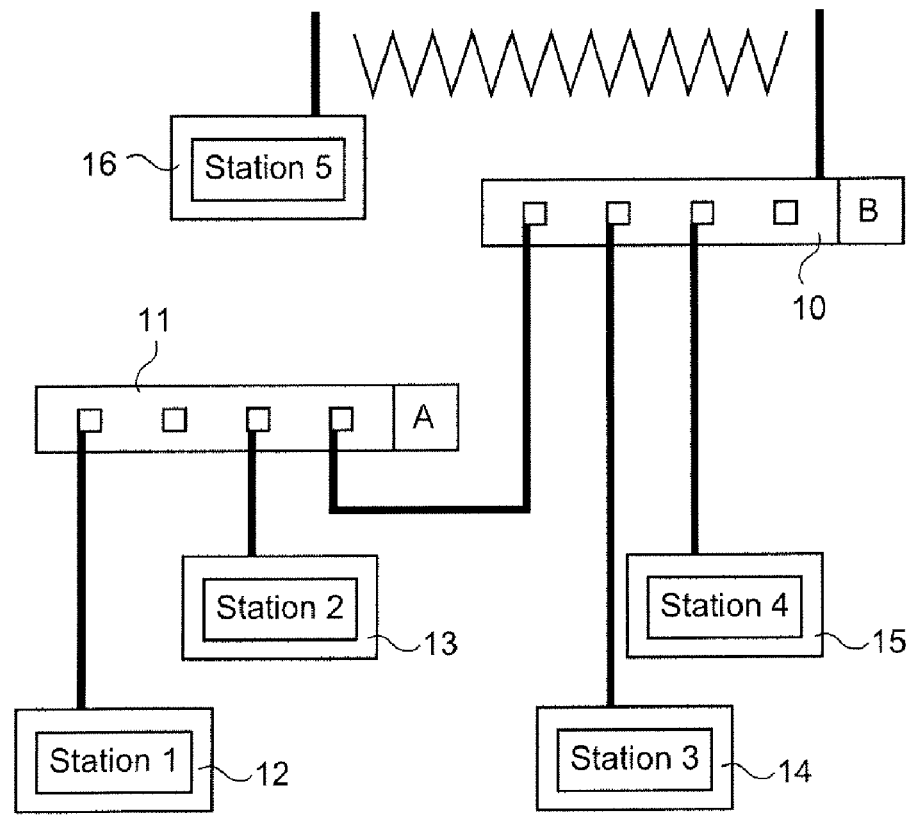
FIG. 1 shows the structure of an example of a network with two network connection switching units.

FIG. 1 shows an example of a domestic network with five network stations 12-16 and two network connection switching units 10, 11. The bus connections between the network connection switching units 10, 11 and the network stations 12 to 15 are based on Ethernet technology, specifically 100 Base/TX Ethernet. The network station 16 is connected to the network connection switching unit 10 without the use of wires, for example via Wireless LAN, in accordance with IEEE802.11b. The connection between the two network connection switching units 10 and 11 is also based on Ethernet technology. Four network connection points (also referred to as ports) are illustrated for each network connection switching unit 10, 11. The figure does not show the Ethernet interfaces in the individual network stations, or those in the network connection switching units.

The 100 Base/TX variant of the Ethernet bus system, which has already been mentioned in the introduction, is used as the transmission system for data transmission in the network. This variant has been regarded as adequate for the chosen application, although a different variant can be used as the transmission system in other applications. By way of example, the so-called 1000 Base/T or 1000 Base/SX or 1000 Base/LX are available for higher data rates. The last two variants are in this case based on optical glass-fibre technology. The illustrated network in FIG. 1 is UPnP-based, that is to say the individual network stations are designed in accordance with the UPnP Standard.

The Ethernet bus system does not provide a protected link for the higher protocol layers, since transmission frames may be lost. This is not adequate for the transmission of large amounts of user data, for which reason the transmission is frequently protected by means of the higher protocol layers. For the UPnP network system, the IP protocol is provided as the next-higher protocol level, corresponding to Internet protocol at the network layer level of the OSI layer model for data communication. The data link layer is implemented only by the TCP protocol, which builds on this. There are specific standardizations for both protocol levels, which are no longer a component of the Ethernet standard, to which reference should just be made with regard to the disclosure of the invention.

Figure 2:
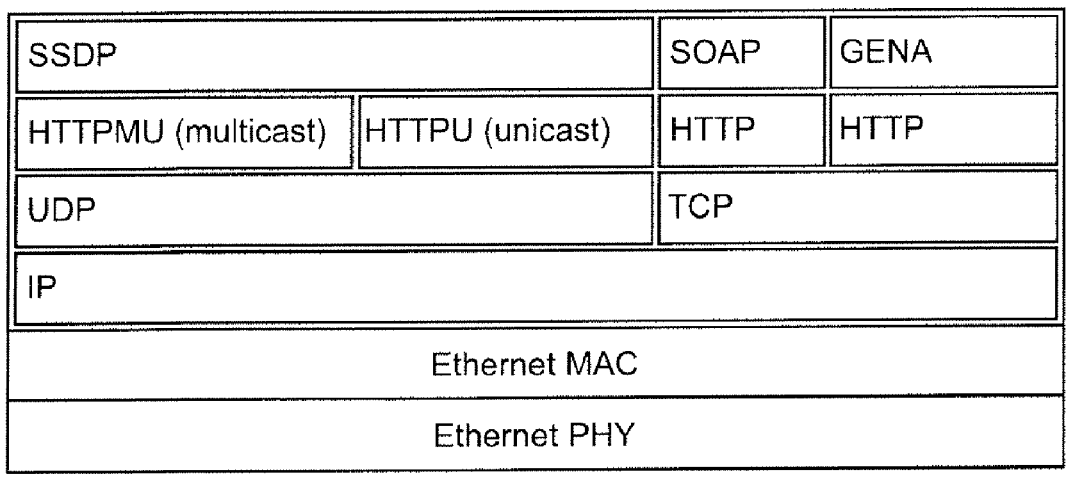
FIG. 2 shows an overview of the software protocols for a network station according to the invention.

An upgraded protocol stack is required for the individual network stations for communication using the UPnP network. This protocol stack is shown in FIG. 2. The two Ethernet protocol levels Ethernet PHY and Ethernet MAC are arranged in the lowest levels. The protocol level IP, which has already been mentioned, is located above this. The UDP protocol is then also arranged at the transport layer level, and is used for the transmission of all messages which are associated with device identification (device discovery). A special version of the HTTP protocol resides above this. This is the HTTPMU protocol (HTTP Multicast Over UDP). HTTP messages such as these are thus passed on, addressed on a pro rata basis, via the lower UDP and IP protocol levels.

The SSDP protocol is also provided above the HTTPMU protocol level. In addition to the UDP protocol, the TCP protocol is also used, which is intended for the transmission of all other UPnP messages, in particular for device and service descriptions, for device control and for event signalling. The HTTP protocol is located above this, with the SOAP protocol located above this at the SSDP protocol level, with the SOAP protocol having previously been referred to as the simple object access protocol. This can be used in order to carry out function calls for other devices, corresponding to remote procedure calls (RPC). Furthermore, the GENA protocol can also be implemented, corresponding to General Event Notification Architecture, which allows registrations for event messages in other network stations.

A complete protocol architecture which is used in the UPnP network system can be found in the UPnP specification (which can be obtained via www.upnp.org).

In the course of UPnP standardization, a specification has also been worked out for the transmission of AV data (audio/video data) between network subscriber stations, and this was completed in June 2002. The precise title of this specification is: UPnP-AV-Architecture: 0.83 dated 12 Jun. 2002. 3 different types of devices are defined in this specification for the transmission of AV data. Firstly, a so-called media server, that is to say that device which is chosen as the source of the AV data. Secondly, there is the media renderer device type, which represents a device which is used as a data sink for the AV data. Thirdly, the control point type is also provided as a specific device type, and is referred to in the following text as a control point device. Normally, for example, a universal remote control for the AV devices is used as the control point device. Alternatively, however, a personal computer can also carry out this task in the network, or else a TV with a remote control may likewise be suitable for use as a control device.

The control point device communicates with two further UPnP devices, which can be used as a data source and data sink for a desired AV link. The control point device initializes and configures both devices for the AV link, so that the desired data stream can also be applied to it. The task of a control point device is thus typically to set up an AV link between two network subscribers, possibly to make changes to the settings of the two devices, and, once the desired AV data stream has been transmitted, to cap the link again, that is to say to request the two devices in the AV link to delete the data characterizing that link.

Figure 3:
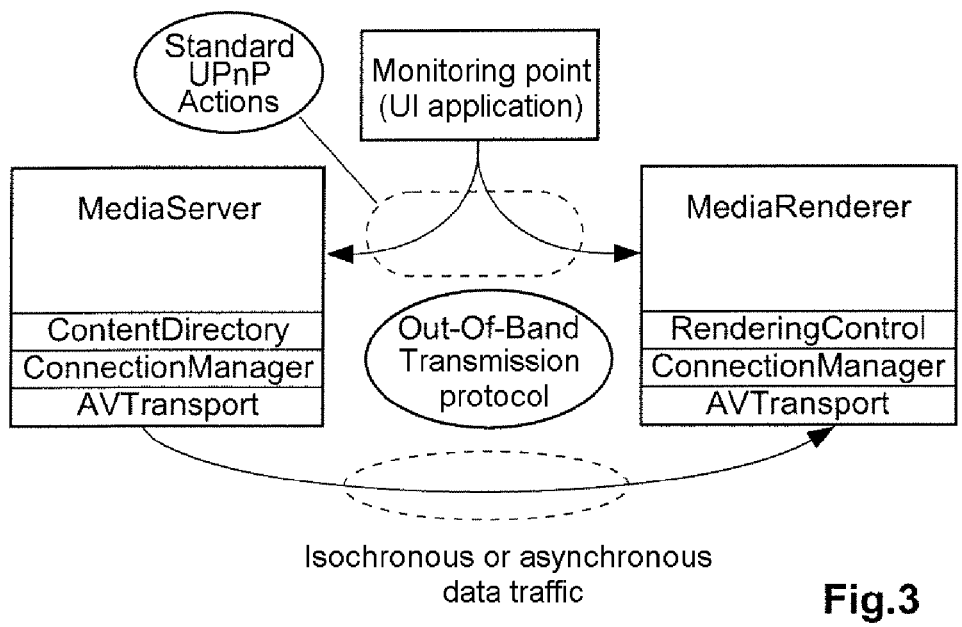
FIG. 3 shows an outline diagram for the transmission of AV data between two network stations on the basis of the UPnP/AV architecture: 0.8.3.

FIG. 3 shows the basic breakdown of network stations which are required for an AV link. The media server device contains or has access to an AV data stream which, for example, is locally stored or is received from the outside. The media server device has access to the AV data and is able to transmit an associated AV data stream via the network to another network station. The AV data stream is in this case transmitted using a transfer protocol appropriate for the transmission medium used in the network. The data transmission formats which are supported by the media server are defined explicitly in the content directory service for each possible resource. The media server device type can typically be associated with one of the following devices: a digital video recorder, CD/DVD player, camera, camcorder, PC, set-top box, satellite receiver, cassette recorder, etc. A module for a content directory is normally implemented in accordance with the UPnP standard in the media server for selection of a specific AV content. In addition, there is also a module which is referred to as the connection manager and by means of which the control point device communicates with a media renderer while setting up a link.

Figure 4:
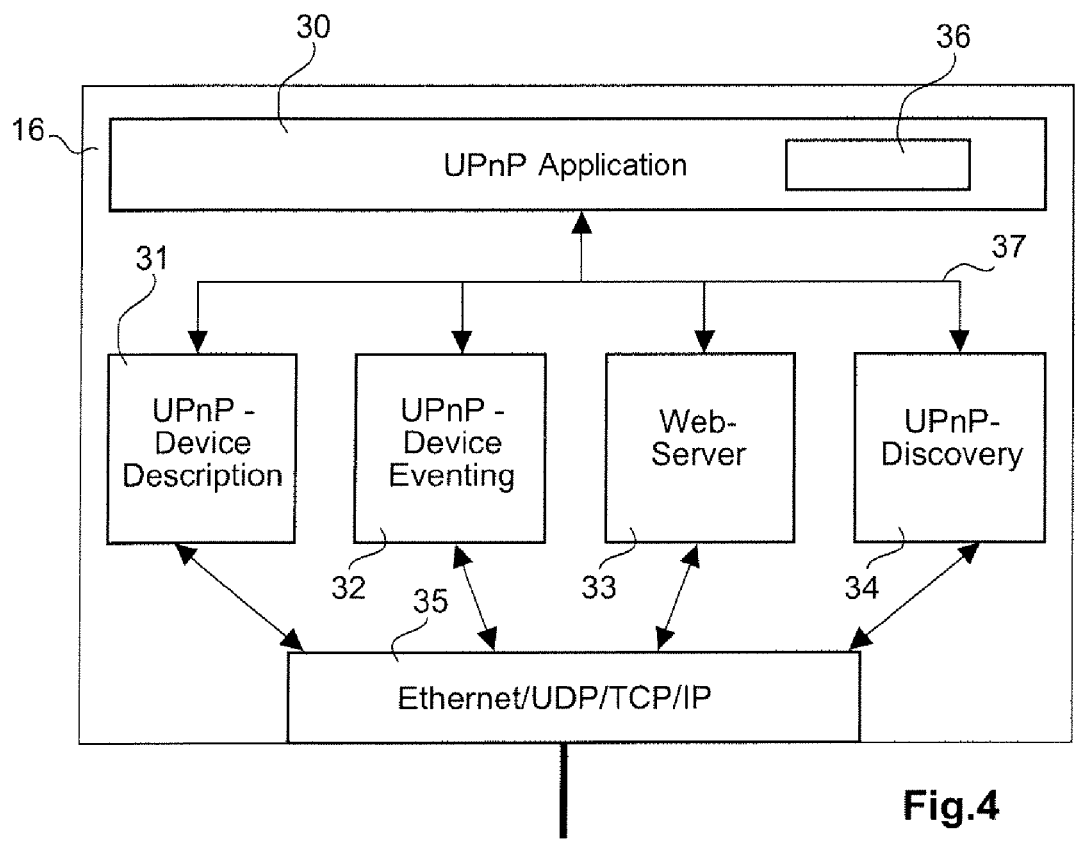
FIG. 4 illustrates important software components of a network station according to the invention.

A media renderer device receives the AV data stream transmitted from the media server and outputs this either as video information or as audio information. In the same way, the media renderer device likewise contains an implementation of the connection manager module for communication with the control point device when setting up a link. A module rendering control is also implemented in the media renderer device. This module receives commands for adjustment of reproduction characteristics such as volume, tone, picture clarity, contrast, brightness, colour etc., and implements them. A TV, a stereo amplifier and an MP3 player are mentioned as examples of devices to which the media renderer device type should be assigned in the domestic network. Depending on the transmission format that is implemented, the media server or the media renderer also has an AV transport service, which is used to control the data transfer and the reproduction (for example play, stop, fast forward etc.). A control point device coordinates the data transport between the media server and the media renderer. It is likewise used to implement the control commands by the operator and to pass them to the appropriate devices on the AV link. Examples of this include, in particular, the commands play, stop, pause, fast forward, fast return. As mentioned in the introduction, the control point devices are also designed to find and control standard UPnP devices. This will be described in more detail in the following text. First of all, the standard software components of a UPnP device will be explained with reference to FIG. 4. The reference number 35 denotes a protocol stack, comprising the protocol levels Ethernet, IP and TCP. The reference number 31 corresponds to the software component, in which the UPnP device description is stored in accordance with the UPnP device description. The reference number 32 denotes a software component in which event messages are administered, corresponding to UPnP eventing. One standard component of the UPnP device is also a web server 33. The reference number 34 denotes a UPnP discovery unit. This allows the UPnP control point device to identify the other devices in the network, as will be described in more detail. A UPnP application program is also denoted by the reference number 30, above these blocks. All of these units are standard components in a UPnP device, and are described in detail in the UPnP specification.

The UPnP discovery unit is used to allow UPnP devices to be found in a network—because they can also be controlled only once they have been found. In principle, this unit operates as follows:

The devices send "discovery messages" as so-called multicast UDP packets. The already mentioned HTTPMU protocol is used for this purpose. Multicast data packets are distinguished in that, in principle, they are transmitted to all the devices in the network. The individual network stations can register with their specific address for reception of such multicast packets. In principle, there are two types of discovery messages:

1. So-called advertisement messages. As soon as a device is linked to a network, it should send an advertisement message. According to the SSDP protocol, this is the "ssdp: alive" message. This informs the other devices in the network that this device is now active in the network. However, once the device has made itself known in the network, it should send these advertisement messages regularly. The control point device can use the lack of the advertisement message to identify that the device has been removed from the network. The maximum session duration for the repeated transmission of the advertisement message is 1800 seconds, that is to say half an hour.

2. Search messages: in order to search for devices, control point devices can send search requests. The "ssdp:discover" message is used for this purpose in accordance with the SSDP protocol. A UPnP device which receives a message such as this must respond to it, thus notifying the sender that it exists.

3. Finally, a third type of advertisement messages is also mentioned—the so-called logging-off messages, which are referred to in accordance with the SSDP protocol as "ssdp: byebye". These are intended to be sent by a device when it is being removed from the network. In fact, the devices can do this when they are switched off in the normal manner. Only when they are disconnected from the network by pulling out the network cable is it no longer possible for physical reasons to send the logging-off message.

One exemplary embodiment of the method according to the invention for detection of the activity of a device in a network of distributed stations will now be explained with reference to FIG. 5.

Figure 5:
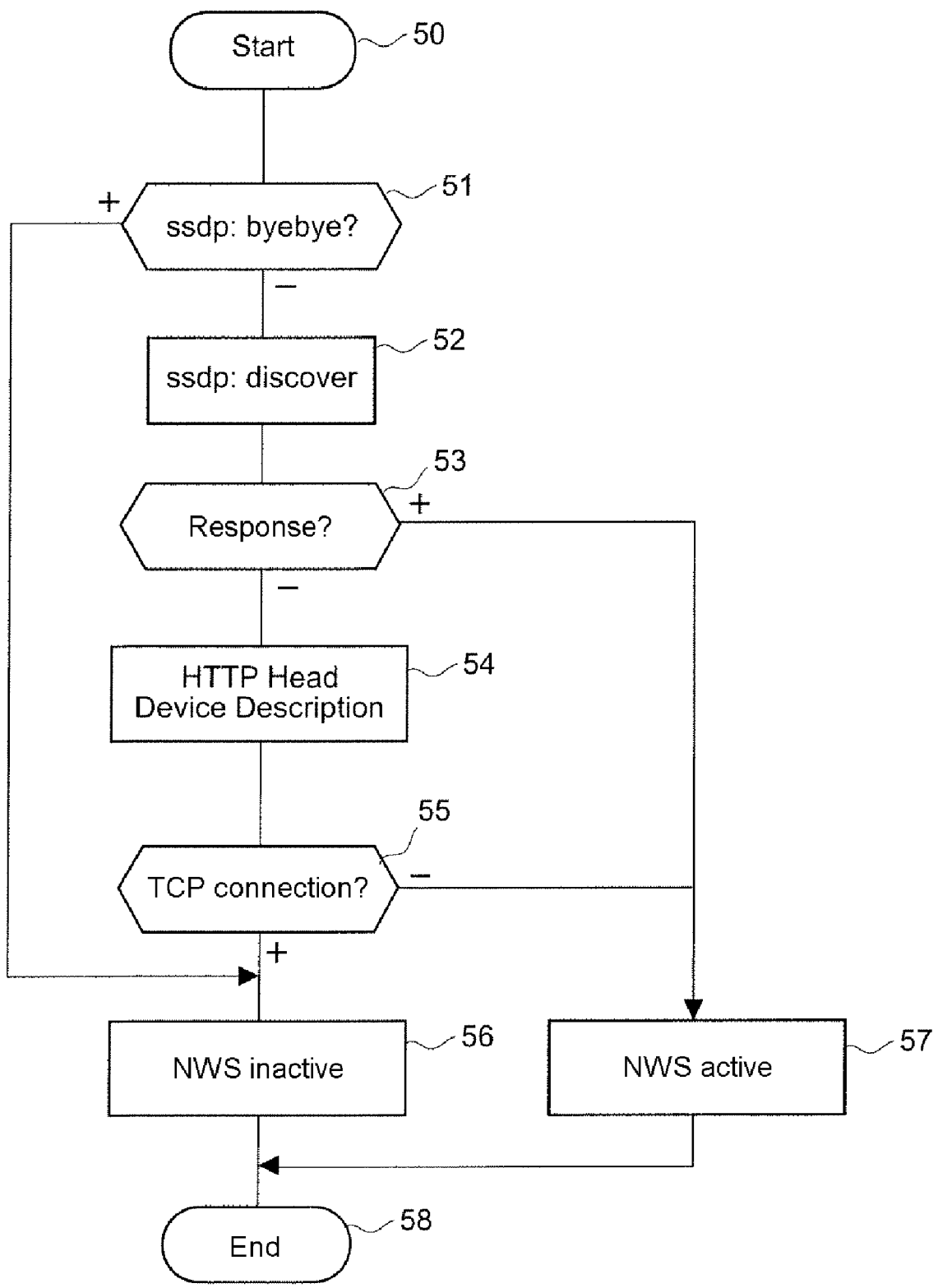
FIG. 5 shows a flowchart for a program by means of which the activity of a network station can be checked.

FIG. 5 shows a flowchart for a program which is run for this purpose in a control point device. The program start is provided with the reference number 50. The reference number 51 marks a check, in which a check is carried out as to whether an ssdp:byebye message has already arrived for the device to be tested. If this is the case, the further processing steps 52 to 55 need not be carried out, and the program jumps directly to the step 56, in which the device in question is classified as having logged off from the network. The program would then end with program step 58. If no logging-off message for the device in question was found in the check 51, a search request for the device in question follows in program step 52. For this purpose, the control point device sends the ssdp:discover message to the device in question. The question 53 then checks whether the search request has been answered within a specific time period by the network station being addressed. If yes, the network station is declared as an active network station in the program step 57. In this case, the appropriate entry can be set in the table of network stations. The program is then ended again with the program step 58.

If it is found in the question 53 that no response to the search request has been received, an HTTP access is made to the XML document with the device description for the network station in question in the program step 54. The URL for this file was notified when that network station logged on, so that the control point device can obtain this information only from an associated table. An example of an HTTP head call is laid out as follows:

Head/upnp/device_description.xml HTTP/1.1
Host: local IP address station 3

Alternatively, an HTTP get call can also be made.

By way of example, the UPnP command get status can be sent by HTTP post access to the network station as a control request.

The question 55 checks whether the desired file has been sent back. If the station in question is inactive, it will not have been possible to set up any TCP link to it. The network station in question will identify just from this that the HTTP access has failed. This is then followed in the program step 56 by the entry in the table for the network stations in order to notify the fact that the network station has logged off from the network or has become inactive in the network. After this, the program once again ends in the program step 58.

The invention claimed is:

1. Method for detection of the activity of a device in a network of distributed stations, in which the activity of one network station is checked by a search request to a network station by means of unprotected transmission protocol which is unprotected against packet losses, with at least one protected transmission protocol in which it is assured that a packet will actually reach its addressee, being made available for data access and/or for controlling a network station,
wherein, if the sought network station does not respond to the search request, a data access and/or a control request to this network station is additionally made by means of the protected transmission protocol wherein the inactivity of the addressed network station is confirmed when the fact that the data access and/or the control request has failed is signalled via the protected transmission protocol.

2. Method according to claim 1, in which the functionalities of a network station to be controlled are made available in the form of one or more information files, and the data access is made to an information file which has been made available for that network station.

3. Method according to claim 1, in which the information file is made available via a data provision service.

4. Method according to claim 1, in which the information file relates to an information page which is generated by description speech.

5. Method according to claim 2, in which the data provision service is in the form of a web server.

6. Method according to claim 3, in which the description speech corresponds to the generation of the information page HTML, corresponding to the hyper text mark-up language or XML, corresponding to the extended mark-up language.

7. Method according to claim 6, in which the HTTP protocol, corresponding to the hypertext transfer protocol, is used as the error-protected data transmission protocol.

8. Method according to claim 7, in which the data access is made by means of an HTTP head access, and/or the control request is made by means of an HTTP post access.

9. Method according to claim 1, in which the SSDP protocol, corresponding to the simple service discovery protocol, is used for a search request.

10. Method according to claim 1, in which the network of distributed stations is a UPnP-based network, corresponding to universal plug and play.

11. Network station for carrying out the method according to claim 1, having
a communication interface, having activity checking means for checking the activity of a network station in a network of distributed stations, with the activity checking means having search request means which produce a search request for the further network station in a network of distributed stations, and transmit this by means of a transmission protocol which is unprotected against packet loss, with communication means being provided which makes available at least one protected transmission protocol in which it is assured that a packet will actually reach its addressee, for a data access and/or for controlling the further network station,
wherein the activity checking means uses the communication means if there is no response to the search request and attempts said data access and/or a control request for the further network station, in that the activity checking means have evaluation means, which evaluate; the data access and/or the reaction to the control request, and confirm the inactivity of the addressed further network station when the fact that the data access and/or the control request has failed is signaled via the protected transmission protocol.

12. Network station according to claim 11, in which the protected data transmission protocol corresponds to the HTTP protocol, corresponding to the hypertext transfer protocol.

13. Network station according to claim 12, in which the data access is made by means of an HTTP head access, and/or the control request is made by means of an HTTP post access.

14. Network station according to claim 11, in which the search request means use the SSDP protocol, corresponding to the simple service discovery protocol, for the search request.

15. Network station according to claim 11, in which the network station is configured in accordance with the UPnP Standard, corresponding to universal plug and play.

16. Network station according to claim 11, in which the communication interface is an Ethernet interface.

\* \* \* \* \*